US011688268B2

(12) United States Patent
Saito et al.

(10) Patent No.: US 11,688,268 B2
(45) Date of Patent: Jun. 27, 2023

(54) INFORMATION PROCESSING APPARATUS AND INFORMATION PROCESSING METHOD

(71) Applicant: SONY CORPORATION, Tokyo (JP)

(72) Inventors: Mari Saito, Kanagawa (JP); Ayumi Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 315 days.

(21) Appl. No.: 16/960,822

(22) PCT Filed: Oct. 20, 2018

(86) PCT No.: PCT/JP2018/039200
§ 371 (c)(1),
(2) Date: Jul. 8, 2020

(87) PCT Pub. No.: WO2019/146187
PCT Pub. Date: Aug. 1, 2019

(65) Prior Publication Data
US 2020/0349825 A1   Nov. 5, 2020

(30) Foreign Application Priority Data

Jan. 23, 2018   (JP) .............................. JP2018-008780

(51) Int. Cl.
| *G10L 15/00* | (2013.01) |
| *G08B 21/24* | (2006.01) |
| *G10L 15/22* | (2006.01) |

(52) U.S. Cl.
CPC .............. *G08B 21/24* (2013.01); *G10L 15/22* (2013.01)

(58) Field of Classification Search
None
See application file for complete search history.

(56) References Cited

U.S. PATENT DOCUMENTS 9,767,794 B2 *   9/2017  Vibbert ................. G06F 9/4843
10,403,273 B2 *  9/2019  Lee ..................... G06F 16/3329
(Continued)

FOREIGN PATENT DOCUMENTS

CN   103582896 A   2/2014
CN   106663241 A   5/2017
(Continued)

OTHER PUBLICATIONS

International Search Report and Written Opinion of PCT Application No. PCT/JP2018/039200, dated Jan. 22, 2019, 09 pages of ISRWO.

*Primary Examiner* — Satwant K Singh
(74) *Attorney, Agent, or Firm* — Chip Law Group

(57) ABSTRACT

To present task information to a user, which is more easily recalled by the user. Provided is an information processing apparatus including a task management unit that registers a task to be executed by a user on the basis of a detected utterance, in which the task management unit registers the task and a context acquired along with the utterance and reminding the user of content of the task in association with each other. Furthermore, provided is an information processing method including registering, by a processor, a task to be executed by a user on the basis of a detected utterance, the registering further including registering the task and a context acquired along with the utterance and reminding the user of content of the task in association with each other.

20 Claims, 17 Drawing Sheets

(56) References Cited

U.S. PATENT DOCUMENTS

| | | | |
|---|---|---|---|
| 10,672,397 B2* | 6/2020 | Lee | G06F 16/3329 |
| 2013/0115927 A1* | 5/2013 | Gruber | H04W 4/02 |
| | | | 455/414.1 |
| 2015/0370884 A1 | 12/2015 | Hurley et al. | |
| 2017/0068403 A1 | 3/2017 | Ohsumi | |
| 2018/0293285 A1 | 10/2018 | Taira et al. | |

FOREIGN PATENT DOCUMENTS

| | | |
|---|---|---|
| EP | 3161755 A1 | 5/2017 |
| JP | 2015-061242 A | 3/2015 |
| JP | 2017-054227 A | 3/2017 |
| JP | 2017-083997 A | 5/2017 |
| JP | 2017-142833 A | 8/2017 |
| JP | 2017-526047 A | 9/2017 |
| KR | 10-2014-0014300 A | 2/2014 |
| RU | 2016150424 A | 7/2018 |
| WO | 2012/167168 A2 | 12/2012 |
| WO | 2015/200042 A1 | 12/2015 |
| WO | 2017/098617 A1 | 6/2017 |

\* cited by examiner

FIG. 1
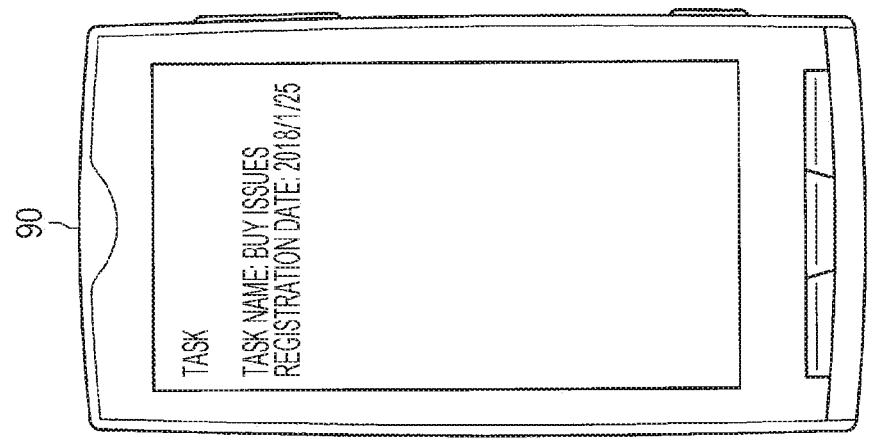
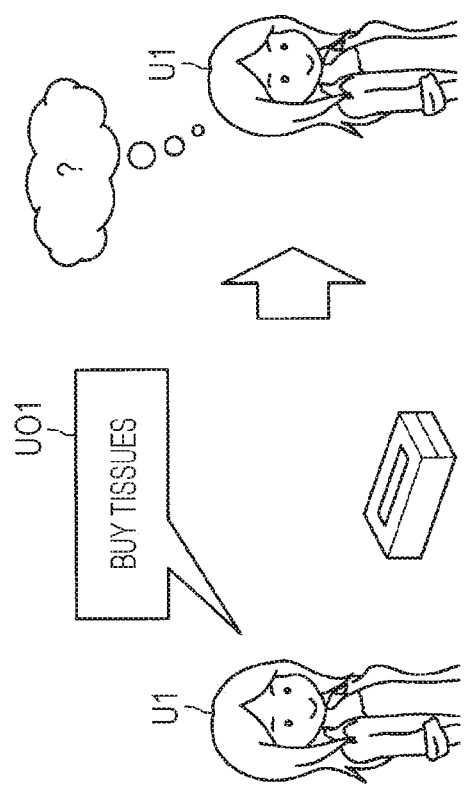

FIG. 10

| TASK | TARGET PERSON | CONTEXT | | | | | | |
|------|---------------|---------|---|---|---|---|---|---|
| | | REQUESTOR | REGISTRATION PLACE | ACTION | STATE | WITH WHO | DEGREE OF URGENCY, NUMBER OF TIMES | EXECUTION PLACE |
| BUY MILK | COMMON | | LIVING ROOM | LOOKED INTO REFRIGERATOR | | | LOW | STORE |
| SUBMIT DOCUMENT | TARO | MANAGER | COMPANY | | IN HURRY | MANAGER, MR. SATO | HIGH | BUSINESS CONNECTION |
| CARRY BOOK | HANAKO | MOTHER | PARENTS' HOME | HAD TEA | LAUGHING | MOTHER | TWICE | PARENTS' HOME |
| ... | ... | ... | ... | ... | ... | ... | ... | ... |

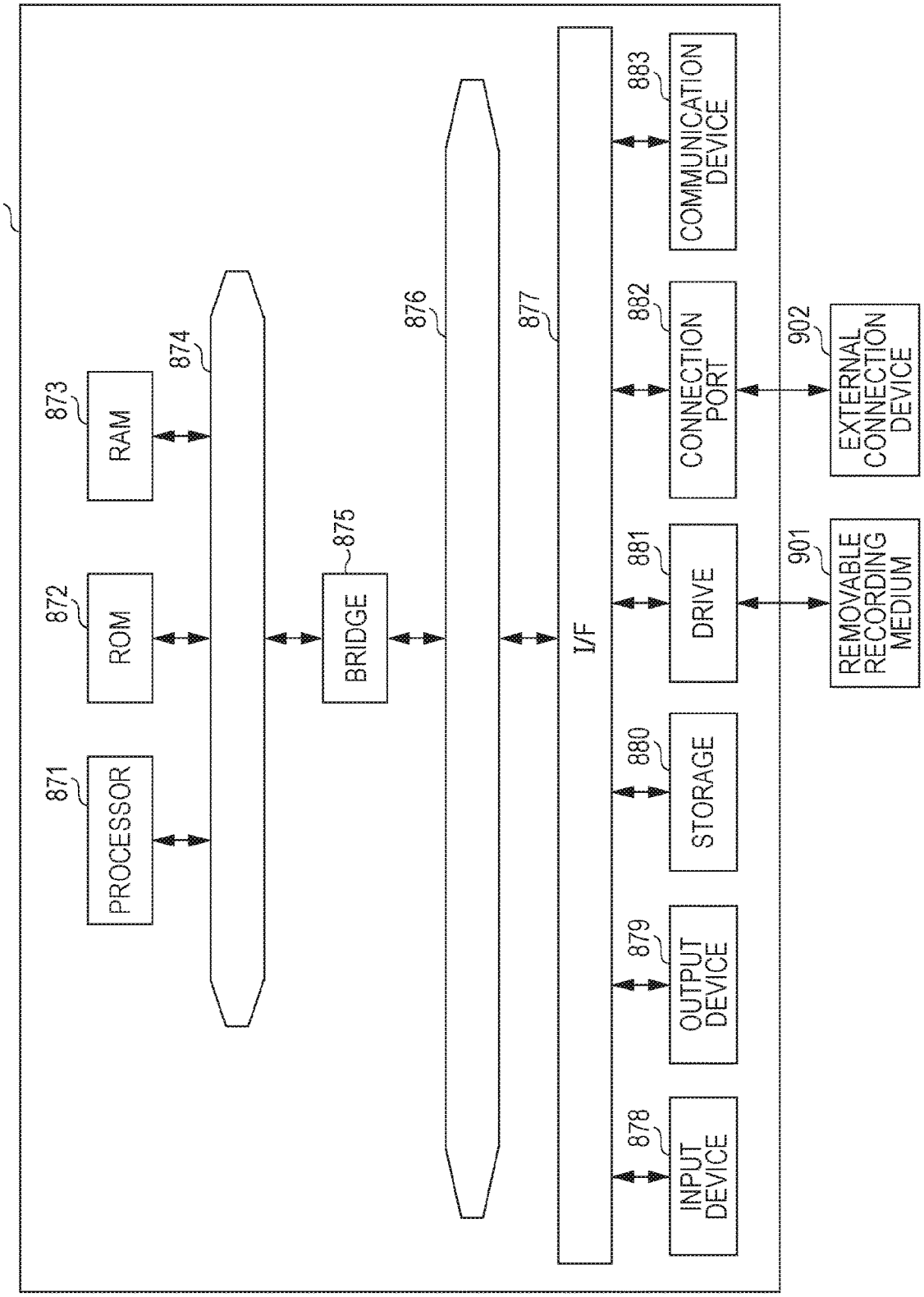

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/039200 filed on Oct. 22, 2018, which claims priority benefit of Japanese Patent Application No. JP 2018-008780 filed in the Japan Patent Office on Jan. 23, 2018. Each of the above-referenced applications is hereby incorporated herein by reference in its entirety.

TECHNICAL FIELD

The present disclosure relates to an information processing apparatus and an information processing method.

BACKGROUND ART

In recent years, systems for managing tasks to be executed by users have become widespread. Furthermore, many technologies for improving convenience have been proposed with respect to task registration, notification, and the like. For example, Patent Document 1 discloses a technology for implementing task registration using sound.

CITATION LIST

Patent Document

Patent Document 1: Japanese Patent Application Laid-Open No. 2017-83997

SUMMARY OF THE INVENTION

Problems to be Solved by the Invention

According to the technology described in Patent Document 1, an input load on a user regarding task registration can be reduced. However, in the technology described in Patent Document 1, it is assumed that the user who has confirmed content of the registered task cannot recall what the task is intended in a case where an utterance of the user is incorrectly recognized.

Therefore, the present disclosure proposes new and improved information processing apparatus and information processing method capable of presenting task information to a user, which is more easily recalled by the user.

Solutions to Problems

According to the present disclosure, provided is an information processing apparatus including a task management unit configured to register a task to be executed by a user on the basis of a detected utterance, in which the task management unit registers the task and a context acquired along with the utterance and reminding the user of content of the task in association with each other.

Furthermore, according to the present disclosure, provided is an information processing method including registering, by a processor, a task to be executed by a user on the basis of a detected utterance, the registering further including registering the task and a context acquired along with the utterance and reminding the user of content of the task in association with each other.

Effects of the Invention

As described above, according to the present disclosure, task information can be presented to a user, which can be more easily recalled by the user.

Note that the above-described effect is not necessarily limited, and any of effects described in the present specification or other effects that can be grasped from the present specification may be exerted in addition to or in place of the above-described effect.

BRIEF DESCRIPTION OF DRAWINGS

FIG. 1 is a diagram for describing a sound input of a task by a comparative technique.

FIG. 10 is examples of task information registered in a task DB according to the embodiment.

FIG. 16 is a diagram illustrating a hardware configuration example of the information processing server according to the embodiment of the present disclosure.

MODE FOR CARRYING OUT THE INVENTION

Figure 2:
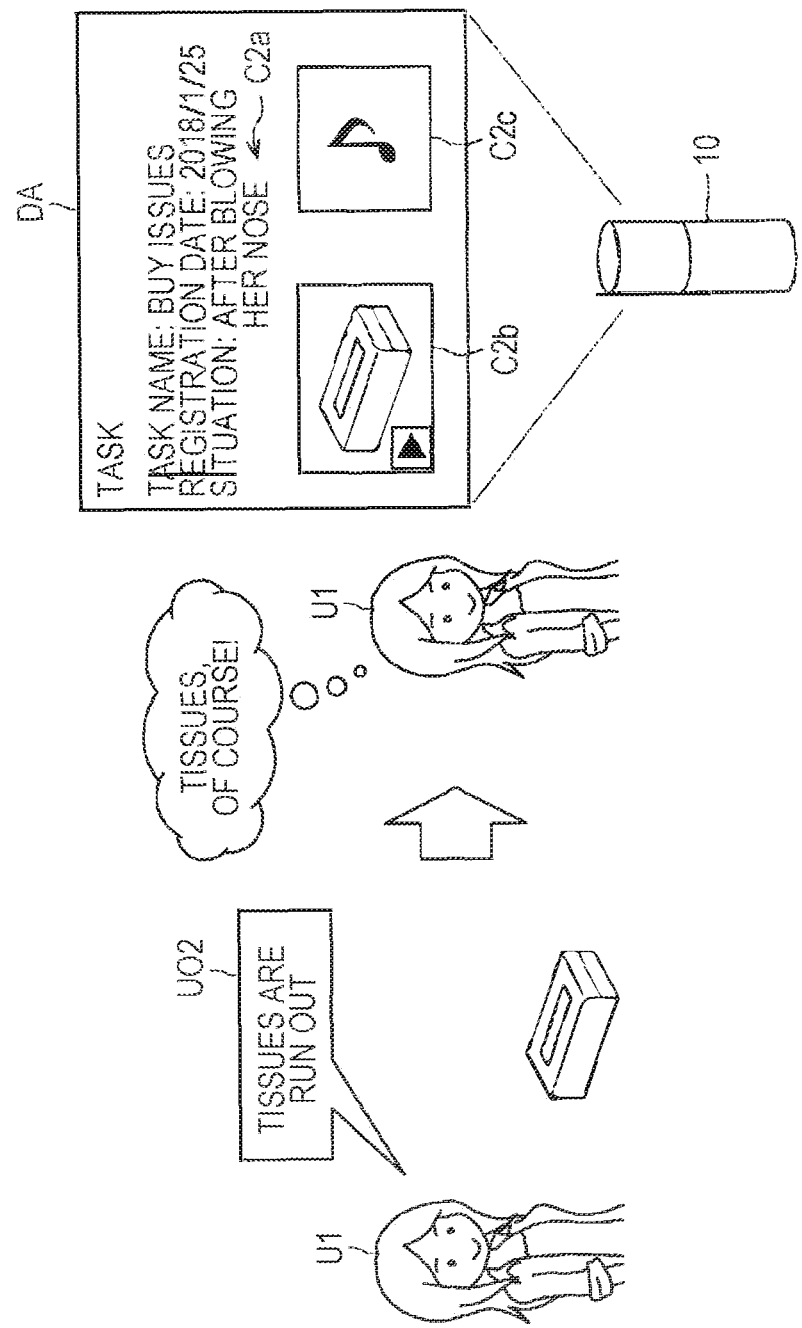
FIG. 2 is a diagram for describing an overview of task registration according to an embodiment of the present disclosure.

A favorable embodiment of the present disclosure will be described in detail with reference to the appended drawings. Note that, in the present specification and drawings, redundant description of configuration elements having substantially the same functional configuration is omitted by providing the same sign.

Note that the description will be given in the following order.

1. First Embodiment
   1.1. Overview
   1.2. System Configuration Example
   1.3. Functional Configuration Example of Information Processing Terminal 10
   1.4. Functional Configuration Example of Information Processing Server 20
   1.5. Details of Task Registration and Output Control
   1.6. Flow of Control
2. Hardware Configuration Example
3. Conclusion

1. First Embodiment

<<1.1. Overview>>

First, an overview of an embodiment of the present disclosure will be described. In recent years, with the development of technology, various information processing terminals have been widely used. By using various functions provided by an information processing terminal, a user is free from manual information management and enjoys various benefits.

One of the above-described functions provided by the information processing terminal is, for example, a task (To do) registration function. The user registers his/her task, which occurs in daily life, in the information processing terminal to cause the information processing terminal to perform deadline management of the task and the like, and can prevent inexecution of the task.

However, for example, in a case where the task is registered in the information processing terminal such as a general-purpose computer or a smartphone using a keyboard or the like, the input load on the user is large, and input operation requires time. Therefore, the task registration by an input method as described above is very complicated operation for the user, and the immediacy regarding the task registration may be lost.

To cope with the above point, implementation of the task registration using a sound recognition technology is assumed, for example. In this case, the user can immediately register the task by an utterance when he/she wants. Therefore, according to the task registration by sound input, the input load on the user can be substantially reduced, and the immediacy regarding the task registration can be improved.

However, in the task registration by sound input, erroneous recognition of the user's utterance is assumed. FIG. 1 is a diagram for describing sound input of a task by a comparative technique. FIG. 1 illustrates a comparative terminal 90 that displays a user U1 who registers a task using sound input and a sound recognition result for an utterance UO1 given by the user U1, as a task registration result.

In the case of the example illustrated in FIG. 1, the user U1 is giving the utterance UO1 of "buy tissues". At this time, the comparative terminal 90 erroneously recognizes the utterance UO1 as "buy issues" and displays the erroneous recognition result on a screen.

As described above, in the case where the utterance is erroneously recognized, it is assumed that the user U1 who has confirmed content of the registered task cannot recall what the task is intended at a later date. In this case, not only the effects of reduction in the input load and improvement of the immediacy that are exerted in the sound input but also the meaning of the task registration itself is lost.

Furthermore, even in the case of the task registration using a keyboard or the like, in a case where the time has elapsed at the time of confirmation since the time of task registration, the user may not be able to recall the content or intention of the registered task even in a state where the registered content has no typographical errors or omissions.

The technical idea according to the present disclosure has been conceived focusing on the above points, and provides a task management function that allows a user to easily and intuitively recall registered content. Therefore, an information processing apparatus according to the embodiment of the present disclosure is characterized in including a task management unit configured to register a task to be executed by a user on the basis of a detected utterance, and in that the task management unit registers the task in association with a context acquired along with the utterance and reminding the user of content of the task.

FIG. 2 is a diagram for describing an overview of the task registration according the present embodiment. FIG. 2 illustrates an information processing terminal 10 that displays the task registered on the basis of an utterance UO2 of the user U1 on a display area DA by a projection function. The information processing terminal 10 may be an information processing apparatus that provides the user with a user interface regarding task registration on the basis of control by an information processing server 20.

In the case of the example illustrated in FIG. 2, the information processing server 20 executes the sound recognition processing for the utterance UO2 of the user U1 collected by the information processing terminal 10 to register the task on the basis of a sound recognition result. At this time, the information processing server 20 according to the present embodiment can automatically generate a task "buy" on the basis of a word "run out" included in the utterance UO2, for example, even in a case where there is no explicit registration instruction by the user U1.

Furthermore, at this time, the information processing server 20 according to the present embodiment is characterized in registering a context acquired along with the utterance UO2 in association with the task. Here, the context according to the present embodiment is additional information indicating various situations regarding the task registration, which can remind the user of the content of the task.

For example, in the case of the example illustrated in FIG. 2, the information processing server 20 registers three contexts C2a to C2c in association with the task "buy issues" generated from the sound recognition result for the utterance UO2 of the user U1, and causes the information processing terminal 10 to display task information regarding the task.

Specifically, the information processing server 20 causes the information processing terminal 10 to display the task information including the context C2a indicating an action conducted by the user before the utterance UO2, the context C2b that is an image of a captured tissue box, and the context C2c that is acquired sound including the utterance UO2. Note that the context C2b may be a moving image in which the tissue box or an action situation of the user U1 is recorded.

According to the above-described function of the information processing server 20 of the present embodiment, even in the case where "tissues" is erroneously recognized as "issues", similarly to the case in FIG. 1, the user U1 can recall "tissues are run out" and can accurately grasp the task's intention by confirming the contexts C2a to C2c included in the task information. Note that the information processing server 20 can estimate that the sound recognition result "issues" is intended for "tissues" on the basis of the recognition of the tissue box from the image captured by the information processing terminal 10 and can automatically correct the sound recognition result.

The overview of the task registration according to the present embodiment has been described. As described above, the information processing server 20 according to the present embodiment can implement information presentation that can be more easily grasped by the user by registering various situations related to task registration in association with a task.

<<1.2. System Configuration Example>>

Figure 3:
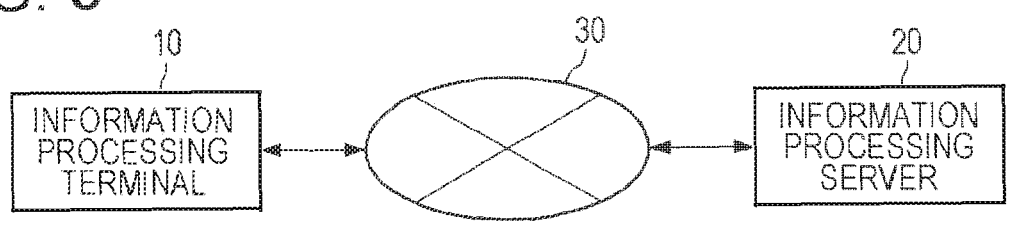
FIG. 3 is a block diagram illustrating a configuration example of an information processing system according to the embodiment.

First, a configuration example of an information processing system according to an embodiment of the present disclosure will be described. FIG. 3 is a block diagram illustrating a configuration example of an information processing system according to the present embodiment. Referring to FIG. 3, the information processing system according to the present embodiment includes the information processing terminal 10 and the information processing server 20. Furthermore, the information processing terminal 10 and the information processing server 20 are connected so as to communicate with each other via a network 30.

(Information Processing Terminal 10)

The information processing terminal 10 according to the present embodiment is an information processing apparatus that presents the user with a user interface regarding task registration on the basis of control by the information processing server 20. The information processing terminal 10 according to the present embodiment is implemented by, for example, a smartphone, a tablet, a wearable device, a general-purpose computer, a stationary-type or an autonomous mobile-type dedicated device, or the like. Furthermore, the information processing terminal 10 according to the present embodiment may be implemented in a complex manner as will be described below, by various display devices and sound output devices arranged indoors such as in a house where the user takes an action.

(Information Processing Server 20)

The information processing server 20 according to the present embodiment is an information processing apparatus that registers a task on the basis of a user's utterance and controls presentation of the registered task. As described above, the information processing server 20 according to the present embodiment is characterized in registering the task in association with the context acquired along with the utterance and reminding the user of the content of the task.

(Network 30)

The network 30 has a function to connect the information processing terminal 10 and the information processing server 20. The network 30 may include a public network such as the Internet, a telephone network, and a satellite network, various local area networks (LAN) including Ethernet (registered trademark), a wide area network (WAN), and the like. Furthermore, the network 30 may include a leased line network such as an internet protocol-virtual private network (IP-VPN). Furthermore, the network 30 may include a wireless communication network such as Wi-Fi (registered trademark) and Bluetooth (registered trademark).

A configuration example of the information processing system according to the present embodiment has been described. Note that the above-described configuration described with reference to FIG. 3 is merely an example, and the configuration of the information processing system according to the present embodiment is not limited to the example. For example, the functions of the information processing terminal 10 and the information processing server 20 according to the present embodiment may be implemented by a single device. The configuration of the information processing system according to the present embodiment can be flexibly modified according to specifications and operations.

<<1.3. Functional Configuration Example of Information Processing Terminal 10>>

Figure 4:
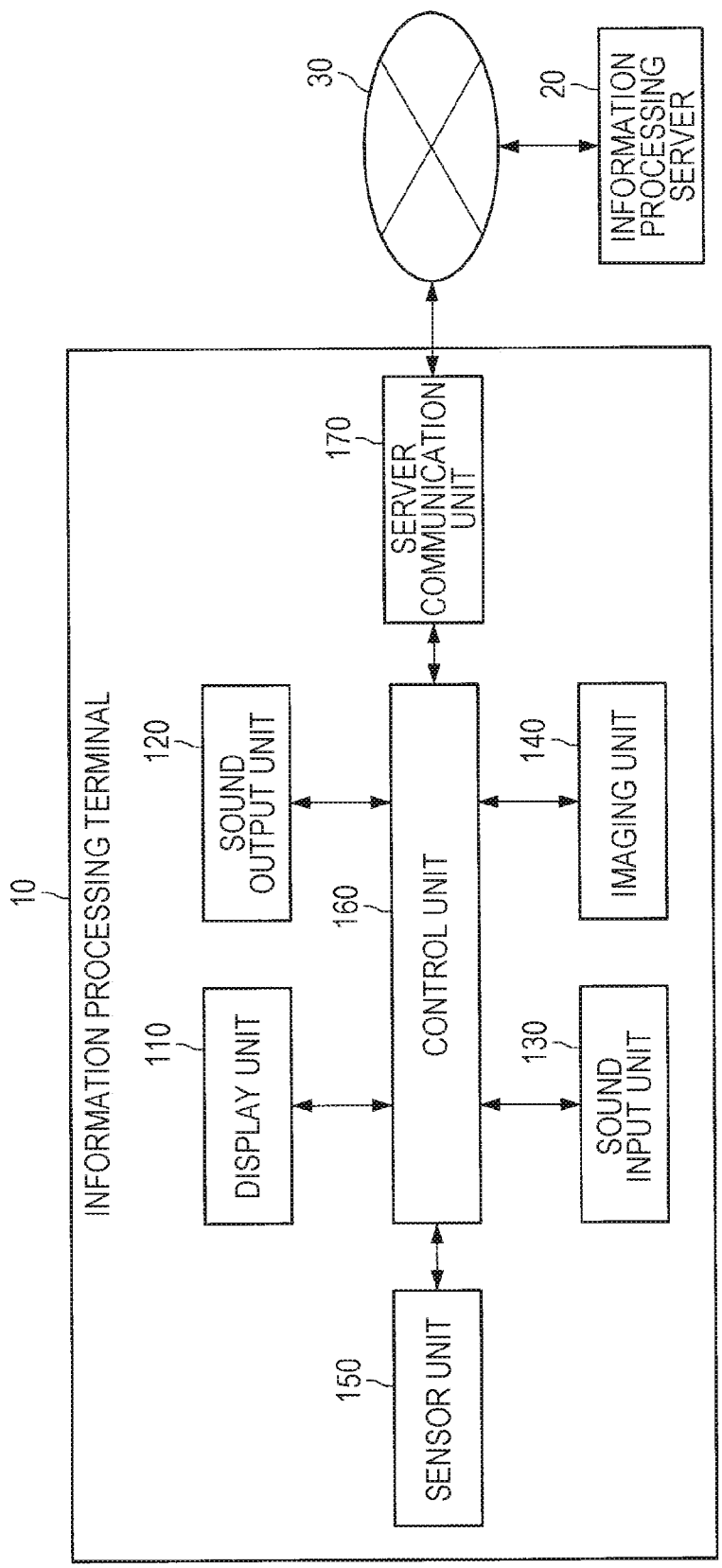
FIG. 4 is a block diagram illustrating a functional configuration example of an information processing terminal according to the embodiment.

Next, a functional configuration example of the information processing terminal 10 according to the present embodiment will be described. FIG. 4 is a block diagram illustrating a functional configuration example of the information processing terminal 10 according to the present embodiment. Referring to FIG. 4, the information processing terminal 10 according to the present embodiment includes a display unit 110, a sound output unit 120, a sound input unit 130, an imaging unit 140, a sensor unit 150, a control unit 160, and a server communication unit 170.

(Display Unit 110)

The display unit 110 according to the present embodiment has a function to output visual information such as images and texts. The display unit 110 according to the present embodiment displays the task information on the basis of the control by the information processing server 20, for example.

For this purpose, the display unit 110 according to the present embodiment includes a display device for presenting the visual information, and the like. Examples of the display device include a liquid crystal display (LCD) device, an organic light emitting diode (OLED) device, a touch panel, and the like. Furthermore, the display unit 110 according to the present embodiment may output the visual information using a projection function.

(Sound Output Unit 120)

The sound output unit 120 according to the present embodiment has a function to output various sounds including sounds. The sound output unit 120 according to the present embodiment outputs the task information using sound on the basis of control by the information processing server 20, for example. For this purpose, the sound output unit 120 according to the present embodiment includes a sound output device such as a speaker and an amplifier.

(Sound Input Unit 130)

The sound input unit 130 according to the present embodiment has a function to collect sound information such as an utterance by the user and an ambient sound generated around the information processing terminal 10. The sound input unit 130 according to the present embodiment includes a microphone for collecting the sound information.

(Imaging Unit 140)

The imaging unit 140 according to the present embodiment has a function to capture an image of the user and the surrounding environment. Image information captured by the imaging unit 140 is used for action recognition and state recognition of the user and object recognition by the information processing server 20, for example. The imaging unit 140 according to the present embodiment includes an imaging device that can capture an image. Note that the above image includes a moving image in addition to a still image.

(Sensor Unit 150)

The sensor unit 150 according to the present embodiment has a function to collect various types of sensor information regarding the surrounding environment and the user. The sensor information collected by the sensor unit 150 can be used for, for example, action recognition and state recognition of the user by the information processing server 20. The sensor unit 150 includes, for example, an infrared sensor, an acceleration sensor, a gyro sensor, or the like.

(Control Unit 160)

The control unit 160 according to the present embodiment has a function to control configurations included in the information processing terminal 10. The control unit 160 controls, for example, start and stop of the configurations. Furthermore, the control unit 160 inputs a control signal generated by the information processing server 20 to the display unit 110 and the sound output unit 120. Furthermore, the control unit 160 according to the present embodiment may have a function equivalent to the task management unit 250 and the output control unit 270 of the information processing server 20 to be described below.

(Server Communication Unit 170)

The server communication unit 170 according to the present embodiment has a function to perform information communication with the information processing server 20 via the network 30. Specifically, the server communication unit 170 transmits the sound information collected by the sound input unit 130, the image information captured by the imaging unit 140, and the sensor information collected by the sensor unit 150 to the information processing server 20. Furthermore, the server communication unit 170 receives a control signal regarding output of the task information from the information processing server 20, and the like.

A functional configuration example of the information processing terminal 10 according to the present embodiment has been described. Note that the above-described configuration described with reference to FIG. 4 is merely an example, and the functional configuration of the information processing terminal 10 according to the present embodiment is not limited to the example. For example, the information processing terminal 10 according to the present embodiment does not necessarily have all of the configurations illustrated in FIG. 4. For example, the information processing terminal 10 can have a configuration without including the sound output unit 120, the sensor unit 150, and the like. Furthermore, as described above, the control unit 160 according to the present embodiment may have a function equivalent to the task management unit 250 and the output control unit 270 of the information processing server 20. The functional configuration of the information processing terminal 10 according to the present embodiment can be flexibly modified according to specifications and operations.

Note that, as described above, the information processing terminal 10 according to the present embodiment may be a stationary dedicated device, various wearable devices worn by the user, or the like, in addition to a smartphone, a tablet, or the like. Furthermore, the information processing terminal 10 according to the present embodiment may be implemented by, for example, a plurality of input/output devices arranged on an inner wall, a ceiling, or the like of a room.

<<1.4. Functional Configuration Example of Information Processing Server 20>>

Figure 5:
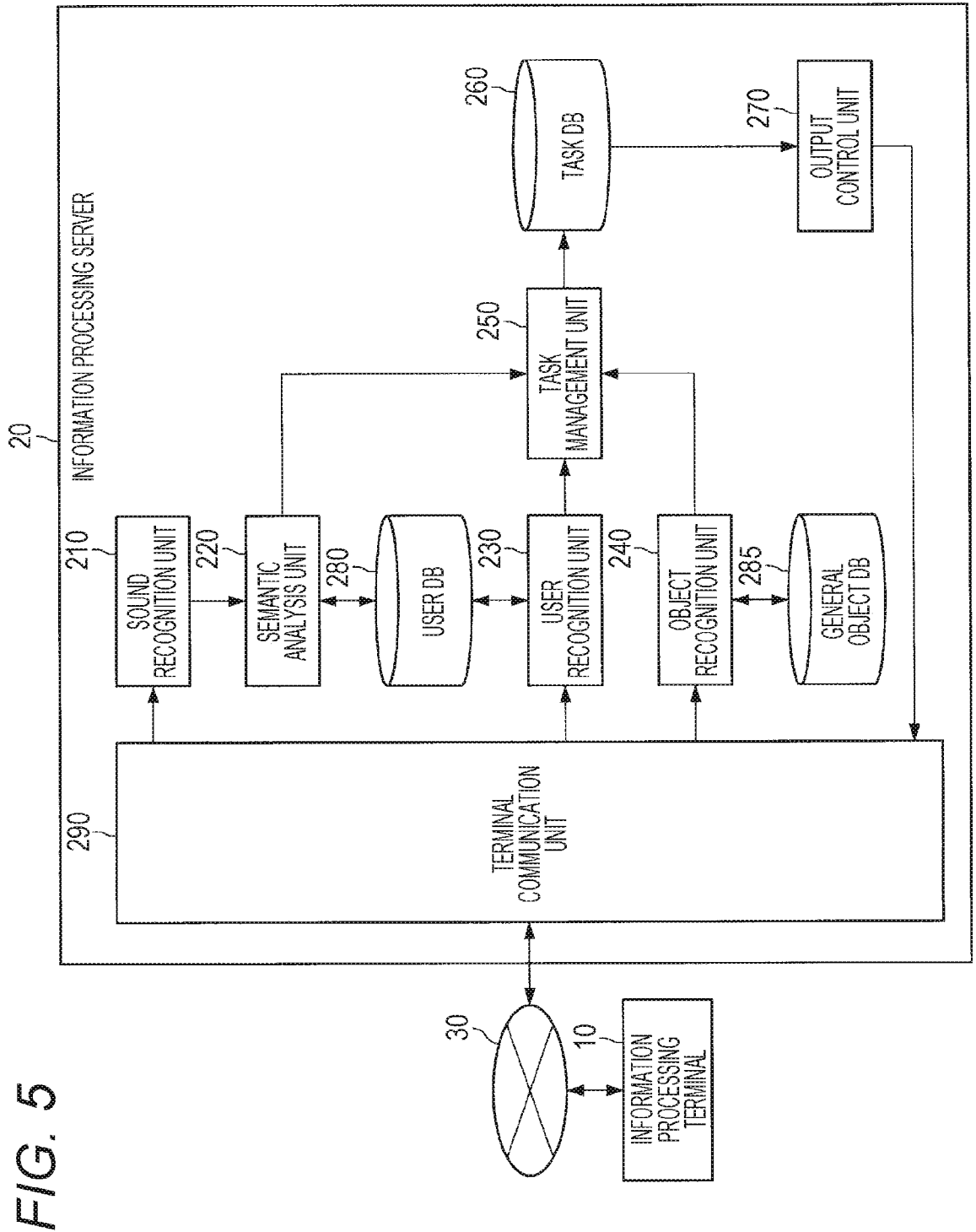
FIG. 5 is a block diagram illustrating a functional configuration example of an information processing server according to the embodiment.

Next, a functional configuration example of the information processing server 20 according to the embodiment of the present disclosure will be described. FIG. 5 is a block diagram illustrating a functional configuration example of the information processing server 20 according to the present embodiment. Referring to FIG. 5, the information processing server 20 according to the present embodiment includes a sound recognition unit 210, a semantic analysis unit 220, a user recognition unit 230, an object recognition unit 240, a task management unit 250, a task DB 260, an output control unit 270, a user DB 280, a general object DB 285, and a terminal communication unit 290.

(Sound Recognition Unit 210)

The sound recognition unit 210 according to the present embodiment executes sound recognition processing on the basis of the sound information regarding an utterance of the user collected by the information processing terminal 10.

(Semantic Analysis Unit 220)

The semantic analysis unit 220 according to the present embodiment performs a semantic analysis regarding the utterance of the user recognized by the sound recognition unit 210. At this time, the semantic analysis unit 220 may perform a semantic analysis optimized for each individual user on the basis of a user's utterance tendency stored in the user DB 280 or the like.

(User Recognition Unit 230)

The user recognition unit 230 according to the present embodiment detects and identifies the user on the basis of the sound information, image information, sensor information, and the like collected by the information processing terminal 10. At this time, the user recognition unit 230 can identify the user by comparing sound data and face image data of the user stored in the user DB 280.

Furthermore, the user recognition unit 230 according to the present embodiment executes the recognition processing for the user on the basis of the sound information, image information, and sensor information collected by the information processing terminal 10. The user recognition unit 230 may detect the detection direction of the user on the basis of the sound information collected by the plurality of microphones provided in the information processing terminal 10, the face detection result, and the like, for example.

Furthermore, the user recognition unit 230 can recognize an action of the user on the basis of, for example, the image information. Furthermore, the user recognition unit 230 can acquire intonation, utterance volume, utterance speed, and the like from the sound information regarding the utterance of the user, and recognize various states including emotions of the user (for example, being impatient, being relaxed, and the like), for example. Furthermore, the user recognition unit 230 may estimate the emotion of the user according to facial expression recognition based on the image information, for example.

(Object Recognition Unit 240)

The object recognition unit 240 according to the present embodiment has a function to recognize an object in an image on the basis of the image information collected by the information processing terminal 10. At this time, the object recognition unit 240 can recognize various objects by comparing characteristics of objects in the image with characteristics of general objects stored in the general object DB 285.

(Task Management Unit 250)

The task management unit according to the present embodiment registers a task to be executed by the user in the task DB 260 on the basis of an analysis result by the semantic analysis unit 220. At this time, the task management unit according to the present embodiment is characterized in registering the task in association with the context acquired along with the utterance and reminding the user of the content of the task in the task DB 260.

Note that, as described above, the task management unit 250 according to the present embodiment may have a function to estimate a task on the basis of the analyzed utterance of the user. The task management unit 250 can estimate, for example, content of the task, a target user, a deadline, and the like.

Furthermore, as described above, the context according to the present embodiment may be additional information indicating various situations regarding the task registration, which can remind the user of the content of the task.

For example, the context according to the present embodiment includes an image acquired along with the utterance of the user. The image includes an image of an article to be targeted for an action in the task and an image illustrating a situation of the user, as illustrated in FIG. 2, for example.

For example, the task management unit 250 specifies an article to be targeted for an action in the task on the basis of the utterance intention of the user analyzed by the semantic analysis unit 220 and the object in the image recognized by the object recognition unit 240, and can register the image regarding the article in association with the task. According to the function of the task management unit 250 according to the present embodiment, the image of the article is confirmed even in the case where the utterance of the user is erroneously recognized, whereby the user can grasp the content of the task.

Furthermore, the task management unit 250 may register an image captured when the user has uttered or before or after the utterance in association with the task, for example. According to the above function of the task management unit 250 of the present embodiment, an effect that the user who has confirmed the image can easily recall the content of the task by visually recognizing the action (for example, blowing his/her nose) conducted before he/she gives utterance, for example, is expected. Note that the image according to the present embodiment may include a moving image in addition to a still image.

Furthermore, the context according to the present embodiment includes the user's utterance itself and various sounds acquired along with the utterance. For example, the task management unit 250 according to the present embodiment registers the user's uttered sound in association with the task, whereby the user can accurately grasp the content of the task even in a case where the sound recognition result is incorrect.

Furthermore, the task management unit 250 registers a sound acquired along with the utterance, for example, an utterance by another person, a sound or music output from a television device or the like, a ringtone of a telephone, a sound of rain, or the like with a task, whereby an effect that the user who hears the sound can easily recall the situation at the time of registration is expected.

As described above, examples of the context according to the present embodiment have been described. However, the context according to the present embodiment is not limited to the examples and includes various types of information that reminds the user of the content of the task. Another example of the context according to the present embodiment will be separately described below.

(Task DB 260)

The task DB 260 according to the present embodiment is a database that records a task in association with various contexts on the basis of the control of the task management unit 250.

(Output Control Unit 270)

The output control unit 270 according to the present embodiment has a function to control output of the task information. The output control unit 270 according to the present embodiment acquires the task and the context stored in the task DB 260, and causes the information processing terminal 10 to output the task information in which the task and the context are associated with each other.

Furthermore, the output control unit 270 according to the present embodiment can control reproduction of a video or a sound associated as contexts, as illustrated in FIG. 2.

Details of the function of the output control unit 270 according to the present embodiment will be separately described below.

(User DB 280)

The user DB 280 according to the present embodiment widely stores various types of information regarding the user. The user DB 280 stores, for example, information such as a face image, a sound characteristic, a preference, and a tendency, in addition to basic information such as user's name, age, and gender.

(General Object DB 285)

The general object DB 285 according to the present embodiment is a database that stores image characteristics regarding various objects. The types of objects stored in the general object DB 285 may be appropriately designed according to the environment where the information processing terminal 10 is used, for example.

(Terminal Communication Unit 290)

The terminal communication unit 290 according to the present embodiment performs information communication with the information processing terminal 10 via the network 30. For example, the terminal communication unit 290 receives the sound information, image information, sensor information, and the like from the information processing terminal 10. Furthermore, the terminal communication unit 290 transmits a control signal regarding output control of the task information generated by the output control unit 270 to the information processing terminal 10.

Heretofore, the functional configuration example of the information processing server 20 according to the embodiment of the present disclosure has been described. Note that the above-described configuration described with reference to FIG. 5 is merely an example, and the functional configuration of the information processing server 20 according to the present embodiment is not limited to the example. For example, the above-described configuration may be implemented by a plurality of devices in a distributed manner. Furthermore, the functions of the information processing terminal 10 and the information processing server 20 may be implemented by a single device, as described above. The functional configuration of the information processing server 20 according to the present embodiment can be flexibly modified according to specifications and operations.

<<1.5. Details of Task Registration and Output Control>>

Next, task registration and output control according to the present embodiment will be described in detail using a specific example. As described above, the task management unit 250 according to the present embodiment can acquire various contexts and register the contexts in association with a task.

Figure 6:
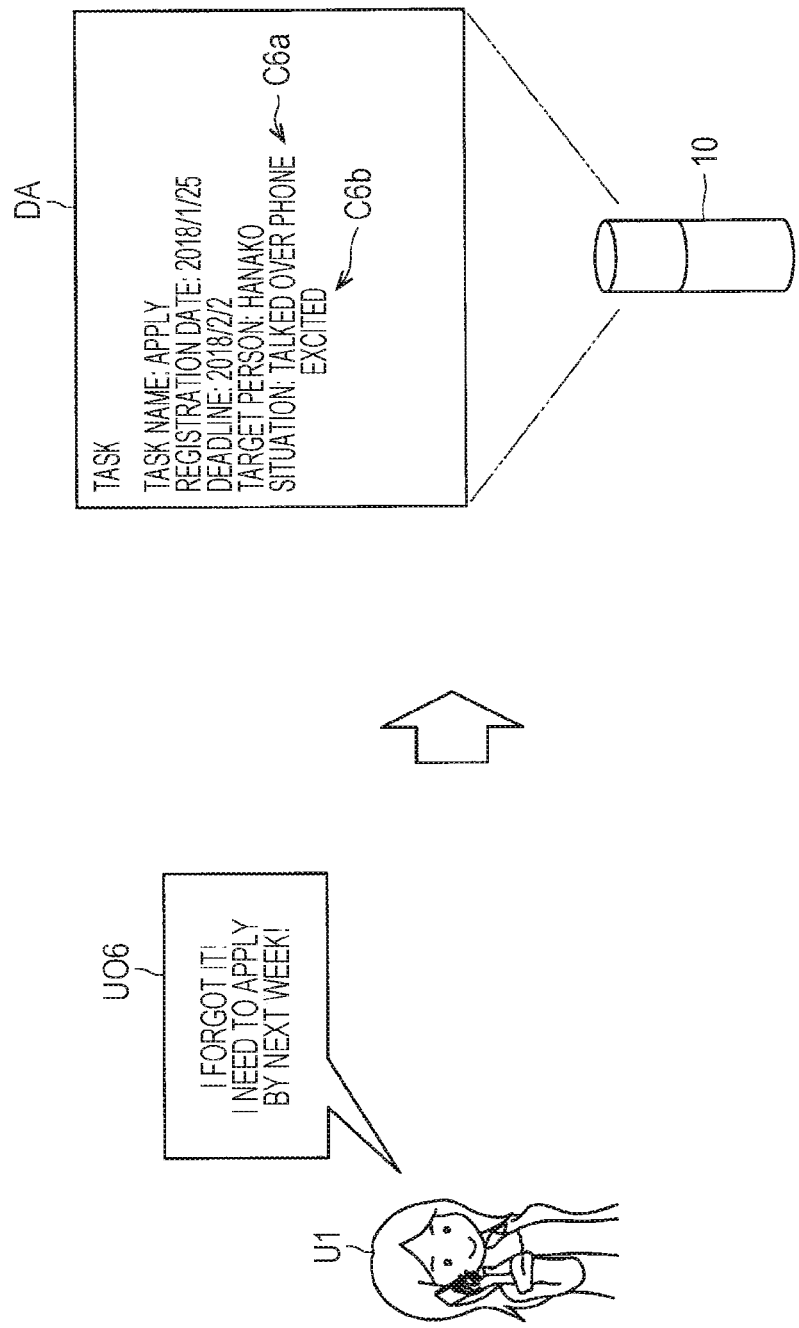
FIG. 6 is a diagram for describing a task associated with a user action and a user state according to the embodiment.

The context according to the present embodiment includes, for example, an action or a state of the user, in addition to the above-described image. FIG. 6 is a diagram for describing a task associated with a user action and a user state according to the present embodiment.

For example, the left side in FIG. 6 illustrates the user U1 who gives an utterance UO6 while talking on a phone. At this time, the task management unit 250 according to the present embodiment can automatically register a task of "apply" on the basis of the meaning of the utterance UO6 analyzed by the semantic analysis unit 220.

For example, the task management unit 250 may define a term leading to registration of the task in advance, and automatically register the task when the term is detected. Examples of the above term may include terms related to purchase of an article such as, "please buy . . . ,", "need to buy . . . ", " . . . is run out", "no . . . anymore", and "need to order . . . ".

In addition, the above terms may include terms related to action execution such as "must do . . . ", "forgot to do . . . ", "please do . . . ", "Have you done . . . ?", and "haven't done . . . yet", for example.

Furthermore, the above terms may include terms related to deadline, such as " . . . is until the end of the month" or "the deadline for . . . is XX", for example.

Furthermore, the task management unit 250 may select a task having a similar sound signal from a predefined list and automatically register a task. The list may include, for example, content such as "creating a New Year's card", "updating wardrobe", "preparing Christmas gifts", "ordering water", and "cleaning a suit". In this case, in a case where it is recognized that the user has uttered "buy water tomorrow", for example, the task management unit 250 can select "ordering water" from the list and register a task with the deadline of tomorrow. The above-described function of the task management unit 250 according to the present embodiment can correctly modify the content of the task even in a case where the user's utterance is erroneously recognized such as "buy water tom", for example.

Furthermore, the task management unit 250 can register the task extracted as described above in association with an action or a state of the user recognized by the user recognition unit 230 in the task DB 260. For example, in the case of the example illustrated in FIG. 6, the user recognition unit 230 can recognize that the user U1 is talking over the phone on the basis of the image collected by the information processing terminal 10. Furthermore, the user recognition unit 230 can recognize that the user U1 is in an excited state on the basis of, for example, the intonation, the utterance volume, or the like of the utterance UO6.

Furthermore, the output control unit 270 according to the present embodiment may output the task information including the task and the context registered as described above in the information processing terminal 10 as visual information, for example. In the case of the example illustrated in FIG. 6, the output control unit 270 displays a context C6*a* indicating an action of the user and a context C6*b* indicating a state of the user in association with the task name "apply" in the display area DA.

According to the above functions of the task management unit 250 and the output control unit 270 of the present embodiment, even in the case where a target to "apply" is not registered as a task, an effect that the user U1 can easily recall the content of the task, that is, the target to "apply" from his/her situation at the time of registering the task by confirming the contexts C6*a* and C6*b* is expected.

Figure 7:
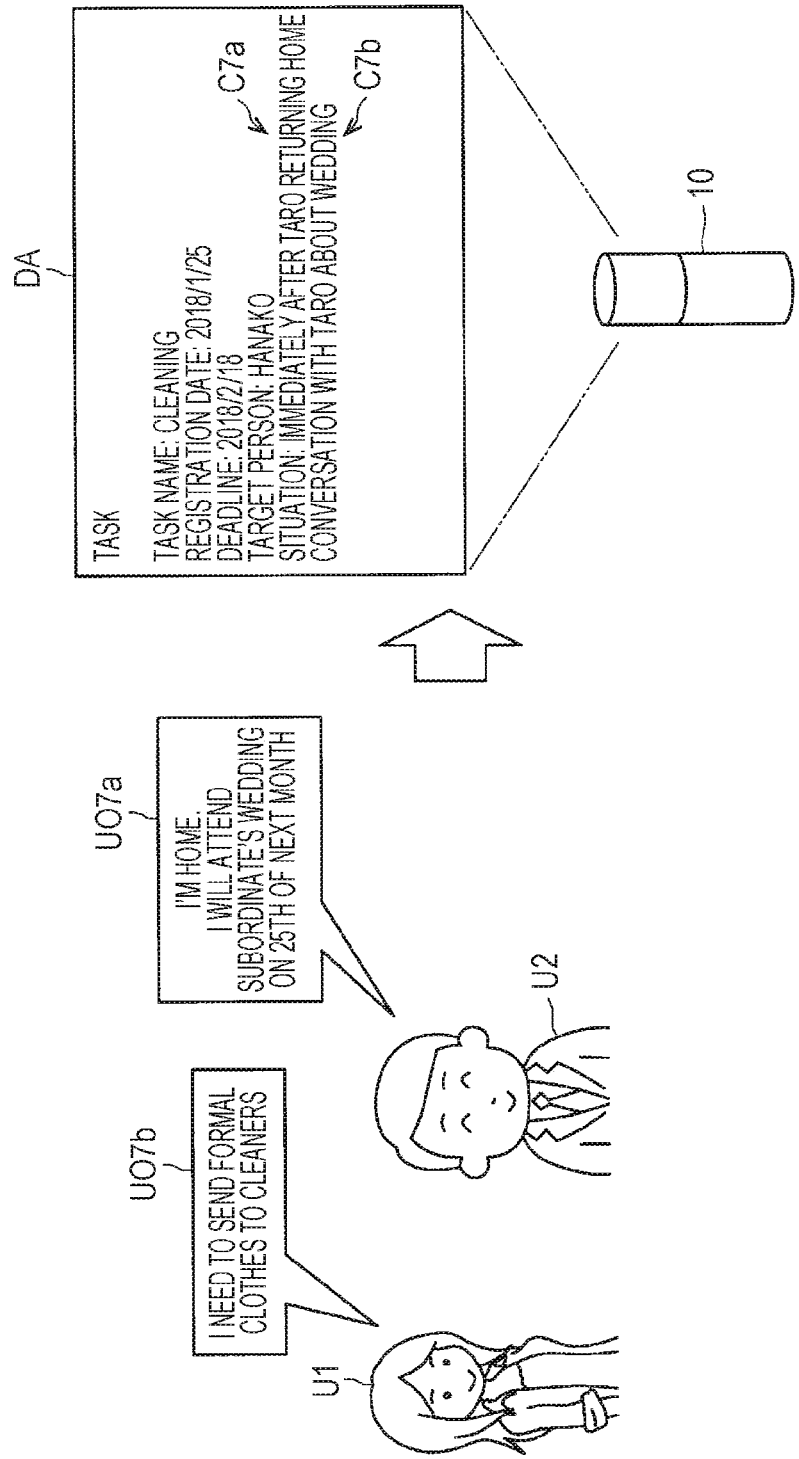
FIG. 7 is a diagram for describing a task associated with another person's situation according to the embodiment.

Furthermore, the context according to the present embodiment includes a state of another person or a situation regarding an interaction with another person in addition to the target user of the task. FIG. 7 is a diagram for describing a task associated with another person's situation according to the present embodiment. The left side in FIG. 7 illustrates the user U2 who gives an utterance UO7*a* regarding a wedding schedule immediately after returning home and the user U1 who gives an utterance regarding cleaning of formal clothes.

At this time, the task management unit 250 may automatically register the task regarding "cleaning" from the utterance UO7*b* of the user U1. Furthermore, the task management unit 250 can register the task in association with a fact that the user U2 has just returned home and that the users U2 and U1 are having a conversation about the wedding as contexts.

At this time, the output control unit 270 may cause the information processing terminal 10 to display the task information including a context C7*a* regarding an action of the user U2 registered as described above and a context C7*b* regarding the conversation with the user U2, as illustrated on the right side in FIG. 7.

According to the above functions of the task management unit 250 and the output control unit 270 of the present embodiment, even in the case where the target for "cleaning" is not registered as a task, an effect that the user U1 can easily recall the target for "cleaning" by confirming the contexts C7*a* and C7*b* is expected.

Figure 8:
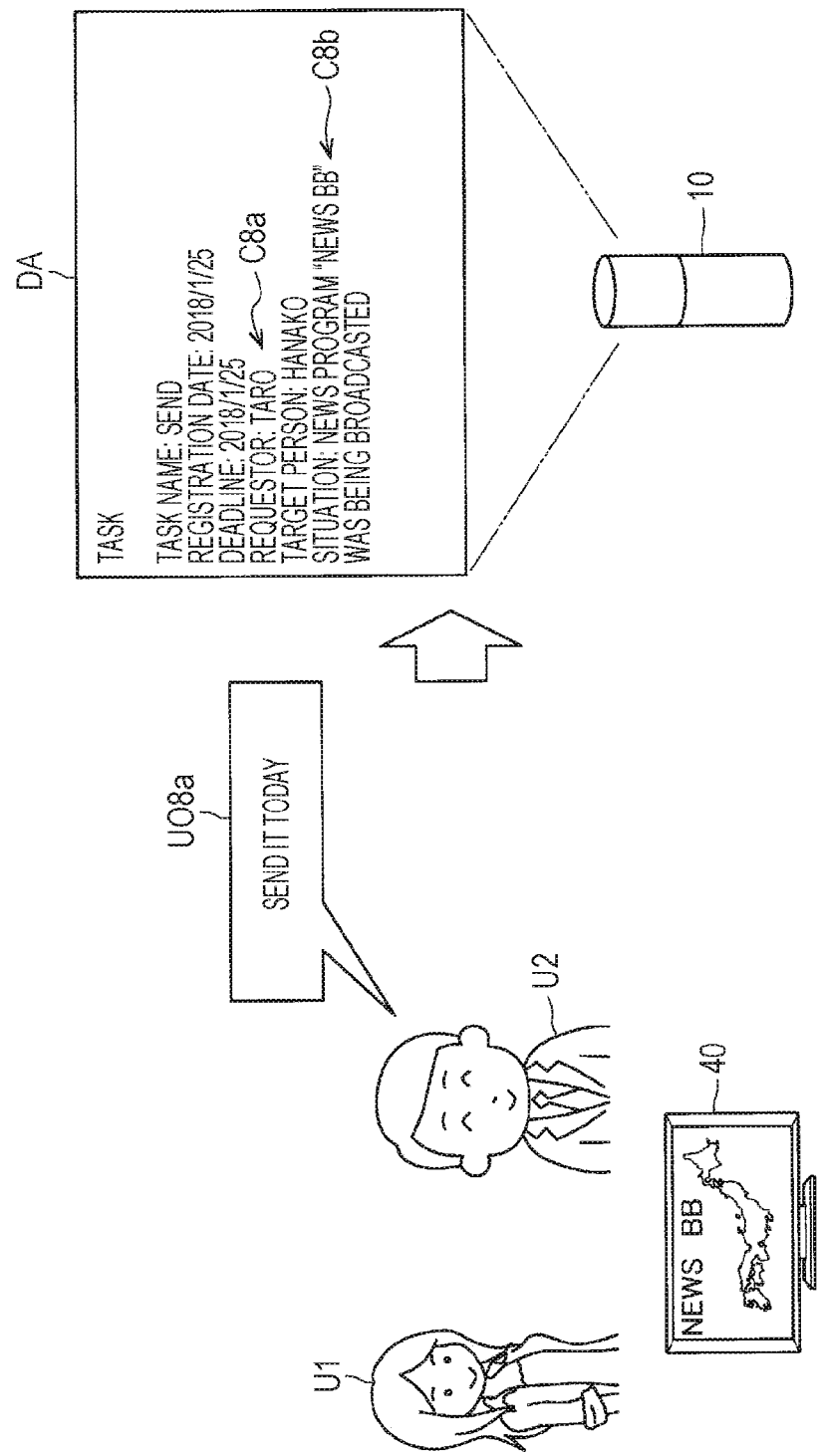
FIG. 8 is a diagram for describing a task associated with a requester according to the embodiment.

Furthermore, the context according to the present embodiment includes a requester of a task. FIG. 8 is a diagram for describing a task associated with a requester according to the present embodiment. The left side in FIG. 8 illustrates the user U1 who is watching a news program "NEWS BB" on a terminal 40 as a television device and the user U2 who gives an utterance UO9*a* for requesting the user U1 to "send it today".

At this time, the task management unit 250 may automatically register a task regarding "send" from the utterance UO8*a* of the user U2 with the deadline of today. Furthermore, the task management unit 250 can register the task in association with a fact that the requester of the task is the user U2 and that the terminal 40 was broadcasting the news program "NEWS BB" as contexts. As described above, the task management unit 250 according to the present embodiment can acquire the operation situation of the terminal 40 including a home electric appliance and the like, and associate the operation situation as a context.

At this time, the output control unit 270 may cause the information processing terminal 10 to display the task information including a context C8*a* regarding the requester registered as described above and a context C8*b* regarding the operation situation of the terminal 40, as illustrated on the right side in FIG. 8.

According to the above functions of the task management unit 250 and the output control unit 270 of the present embodiment, even in the case where the target to "send" is not registered as a task, an effect that the user U1 can easily recall the target to "send" by confirming the contexts C8*a* and C8*b* is expected.

As above, the contexts regarding the another person and the requester according to the present embodiment have been described. The task management unit 250 according to the present embodiment registers the contexts as described above with the task, thereby reminding the target user of the content of the task. Meanwhile, in a case where the behavior of the another person at the time of registering the task is irrelevant to the content of the task, recalling of the content of the task by the target user may be hindered by the association of the behavior as a contexts.

Therefore, the task management unit 250 according to the present embodiment determines that the behavior of the another person is not suitable for a context in a case where the relevance between the behavior of the another person and the task is low and does not associate the behavior with the task.

Figure 9A:
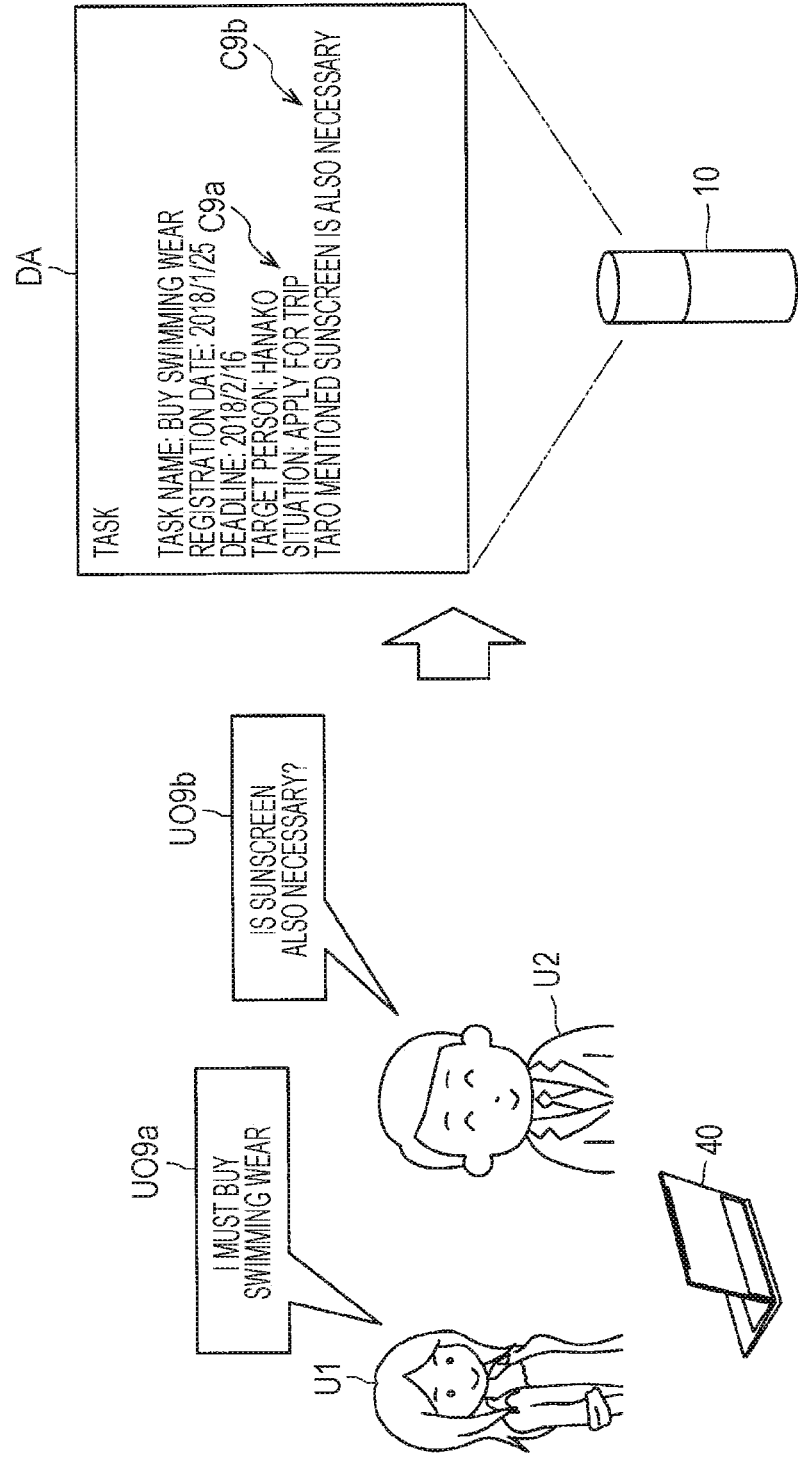
FIG. 9A is a diagram for describing context association based on relevance according to the embodiment.
Figure 9B:
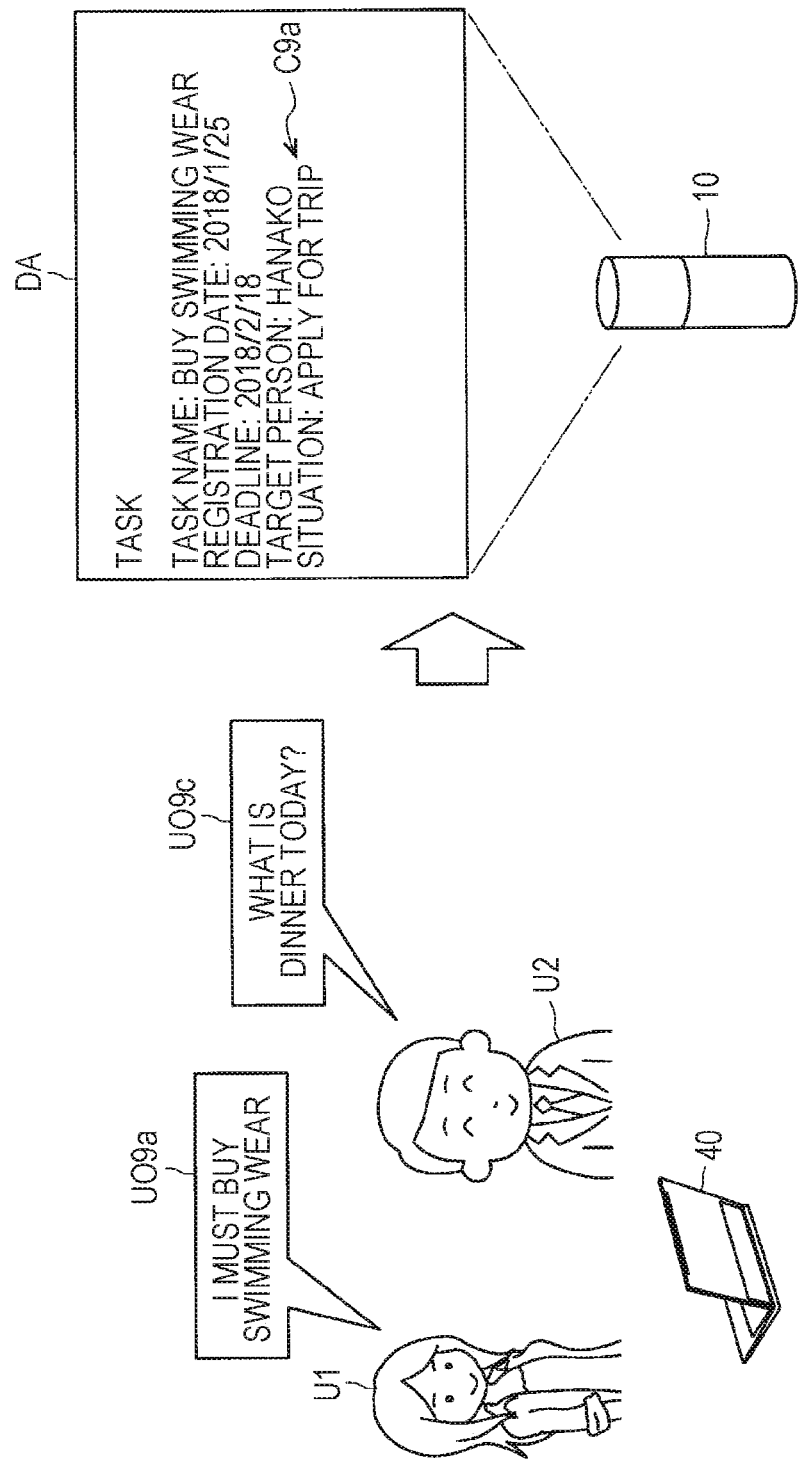
FIG. 9B is a diagram for describing context association based on relevance according to the embodiment.

FIGS. 9A and 9B are diagrams for describing context association based on the relevance according to the present embodiment.

The left side in FIG. 9A illustrates the users U1 and U2 who apply for a travel on the terminal 40. Furthermore, in the example illustrated in FIG. 9A, the user U1 is giving an utterance UO9a of "I must buy swimming wear" and the user U2 is giving an utterance UO9b of "Is sunscreen also necessary?".

At this time, the task management unit 250 according to the present embodiment may automatically register a task regarding "buy swimming wear" on the basis of the utterance UO9a of the user U1. Furthermore, the task management unit 250 determines that the utterance UO9b of the user U2 is suitable as a context on the basis of the fact that the application for a trip has been made on the terminal 40 and that the relevance between "swimming wear" and "sunscreen" is high, and associate the context with the task. In this way, the task management unit 250 can also register a behavior of another person who has intervened in the utterance in association with a task as a context.

At this time, the output control unit 270 may cause the information processing terminal 10 to display the task information including a context C9a regarding the application for a travel registered as described above and a context C9b regarding the utterance UO9b of the user U2, as illustrated on the right side in FIG. 9A.

Meanwhile, in the example illustrated in FIG. 9B, the user U1 is giving the utterance UO9a of "I must buy swimming wear" and the user U2 is giving an utterance UO9c of "What is dinner today?". In this case, the task management unit 250 determines that the utterance UO9b of the user U2 is not suitable as a context on the basis of the fact that the relevance between "swimming wear" and "dinner today" is low, and do not need to associate a context with the task.

As described above, the task management unit 250 according to the present embodiment can determine whether or not a behavior of another person is suitable as a context on the basis of the relevance with the task. The task management unit 250 according to the present embodiment associates a behavior of another person, which is originally irrelevant with a task, with the task as a context, thereby effectively reducing the possibility of hindering the user from recalling the content of the task.

The context according to the present embodiment has been described with reference to the specific examples. As described above, the task management unit 250 according to the present embodiment registers various contexts in association with a task, thereby implementing the task information that can be more easily recalled by the user.

FIG. 10 is examples of the task information registered in the task DB 260 according to the present embodiment. Referring to FIG. 10, it can be seen that the task information according to the present embodiment includes the target user of the task and various contexts in addition to the content of the task.

In the case of the examples illustrated in FIG. 10, as the contexts, a requester, places such as a registration place and an execution place, an action and a state of the user, another person who has been with, a degree of urgency or the number of times, and the like are registered in association with a task. Note that the context according to the present embodiment is not limited to the examples illustrated in FIG. 10, and may include, for example, the above-described images and sounds, operating situations of other terminals, weather and temperature, illuminance, time, and the like.

Furthermore, the output control unit 270 according to the present embodiment may perform input/output control regarding a user interface for the user to search for a task on the basis of the context associated as described above.

The output control unit 270 can acquire a list of tasks associated with the contexts on the basis of the contexts such as a requester, a registration place, an action, a state or the like specified by the user, for example, and causes the information processing terminal 10 to display the list.

According to the above function of the output control unit 270 according to the present embodiment, the user can specify a more flexible condition to search for a task, and a highly convenient task management application can be implemented.

Next, output control of the task information by the output control unit 270 according to the present embodiment will be described in detail. As described above, the output control unit 270 according to the present embodiment can cause the information processing terminal 10 to output the task information including various contexts. At this time, the output control unit 270 according to the present embodiment can control an output position of the task information on the basis of a target person or a context of a task.

Figure 11:
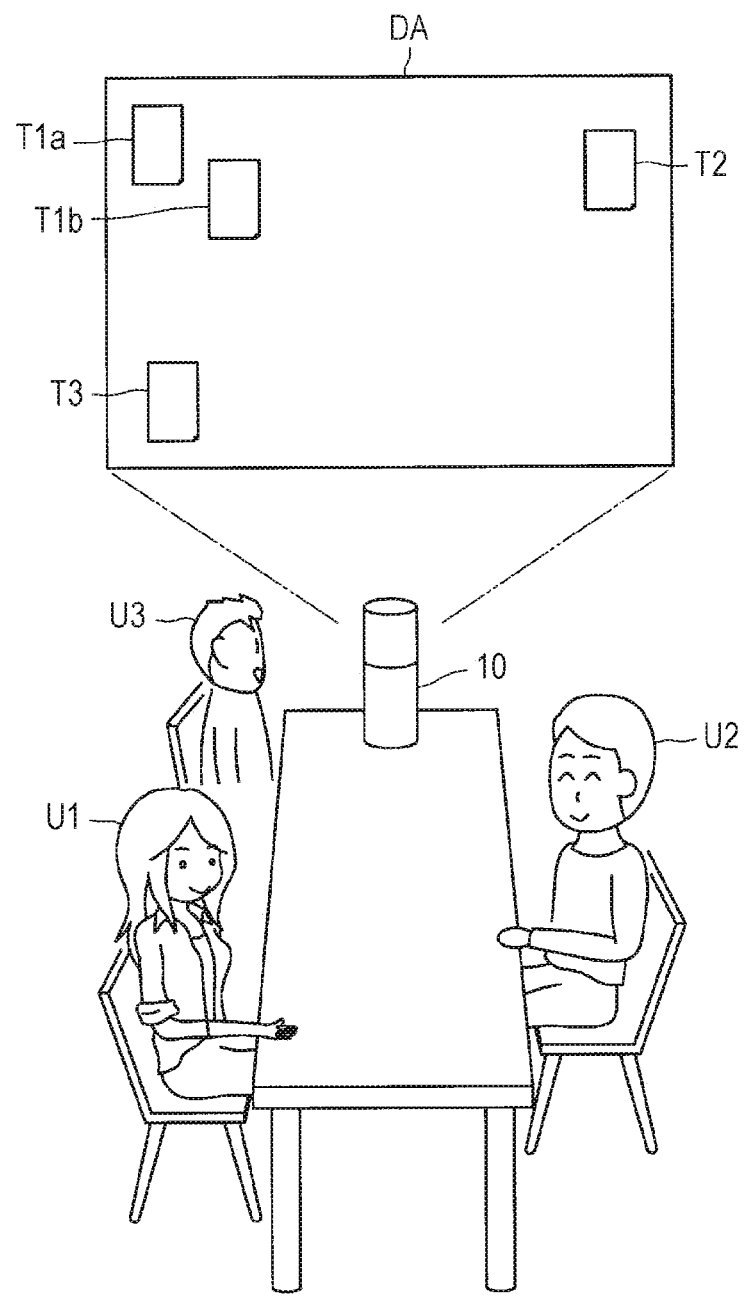
FIG. 11 is a diagram for describing output control based on a target user according to the embodiment.

FIG. 11 is a diagram for describing output control based on a target user according to the present embodiment. FIG. 11 illustrates an example in which the output control unit 270 according to the present embodiment controls the output position of the task information on the basis of the position of the target user of the task.

Specifically, the output control unit 270 may cause the information processing terminal 10 to output the task information in accordance with the position of a table at which the target user of the task sits on a daily basis. For example, in the case of the example illustrated in FIG. 11, the output control unit 270 causes the information processing terminal 10 to display task information T1a and T1b for the user U1 as the target user and task information T3 for the user U3 as the target user on the left side in the display area DA because the users U1 and U3 usually sit on the left side of the table.

Meanwhile, the output control unit 270 causes the information processing terminal 10 to display task information T2 for the user U2 as the target user on the right side in the display area DA because the user U2 usually sit on the right side of the table.

Furthermore, the output control unit 270 causes the information processing terminal 10 to display the task information T1a and T1b for the user U1 as the target user and the task information T2 for the user U2 as the target user in an upper portion of the display area DA because the users U1 and U2 are adults.

Meanwhile, the output control unit 270 causes the information processing terminal 10 to display the task information T3 for the user U3 as the target user in a lower portion of the display area DA because the user U3 is a child.

As described above, the output control unit 270 according to the present embodiment can display the task information at the positions where the target information can be easily visually recognized according to the positions or the heights of the lines of sight of the target users, thereby effectively preventing inexecution of the task and the like.

Figure 12:
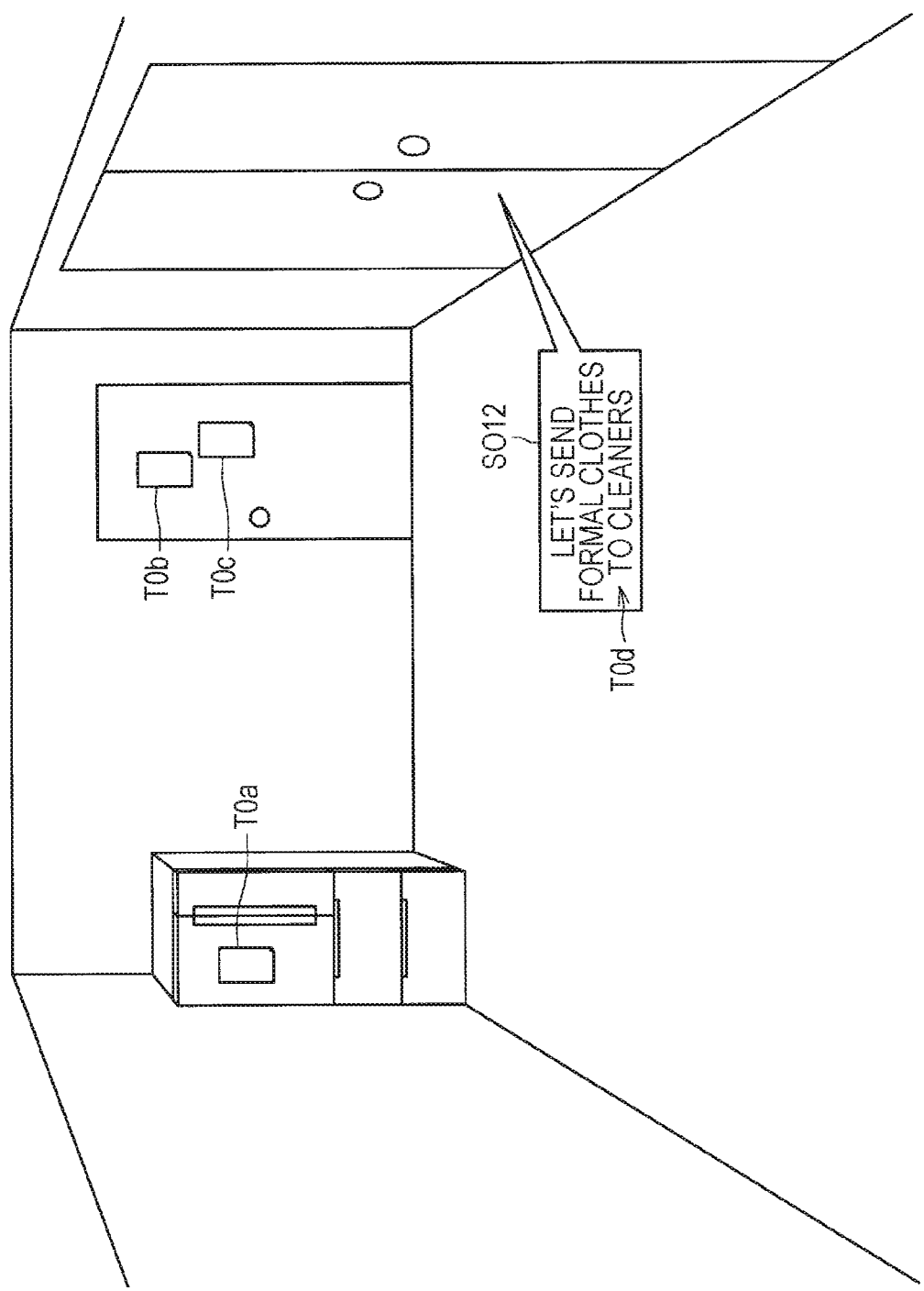
FIG. 12 is a diagram for describing output control based on a context according to the embodiment.

Furthermore, the output control unit 270 according to the present embodiment may control the output position of the task information on the basis of a context. FIG. 12 is a diagram for describing output control based on a context according to the present embodiment.

FIG. 12 illustrates an example in which the output control unit 270 according to the present embodiment controls the output position of the task information on the basis of a context such as a registration place or an execution place. For example, the output control unit 270 may project and display task information T0a registered on the basis of an utterance given when the user has opened a refrigerator, on the refrigerator that is a registration place of the task.

Furthermore, as for task information T0b and T0c for which the execution place of a task is outside a house such as a company or a store, for example, the output control unit 270 can project and display the task information on a front door so that the user can easily see the information when going out.

Furthermore, the output control unit 270 according to the present embodiment can output the task information using sound. In the case of the example illustrated in FIG. 12, the output control unit 270 causes the sound output unit 120 provided near a closet to output task information Tod regarding cleaning of formal clothes using a sound SO12. As described above, the output control unit 270 according to the present embodiment can output the task information using the plurality of display unit 110 and the sound output unit 120 arranged indoors such as a house.

According to the above-described function of the output control unit 270 of the present embodiment, the task information is output at the place where the user can easily recall the content of the task, such as the registration place or the execution place of the task, whereby inexecution of the task by the user can be effectively prevented.

Figure 13:
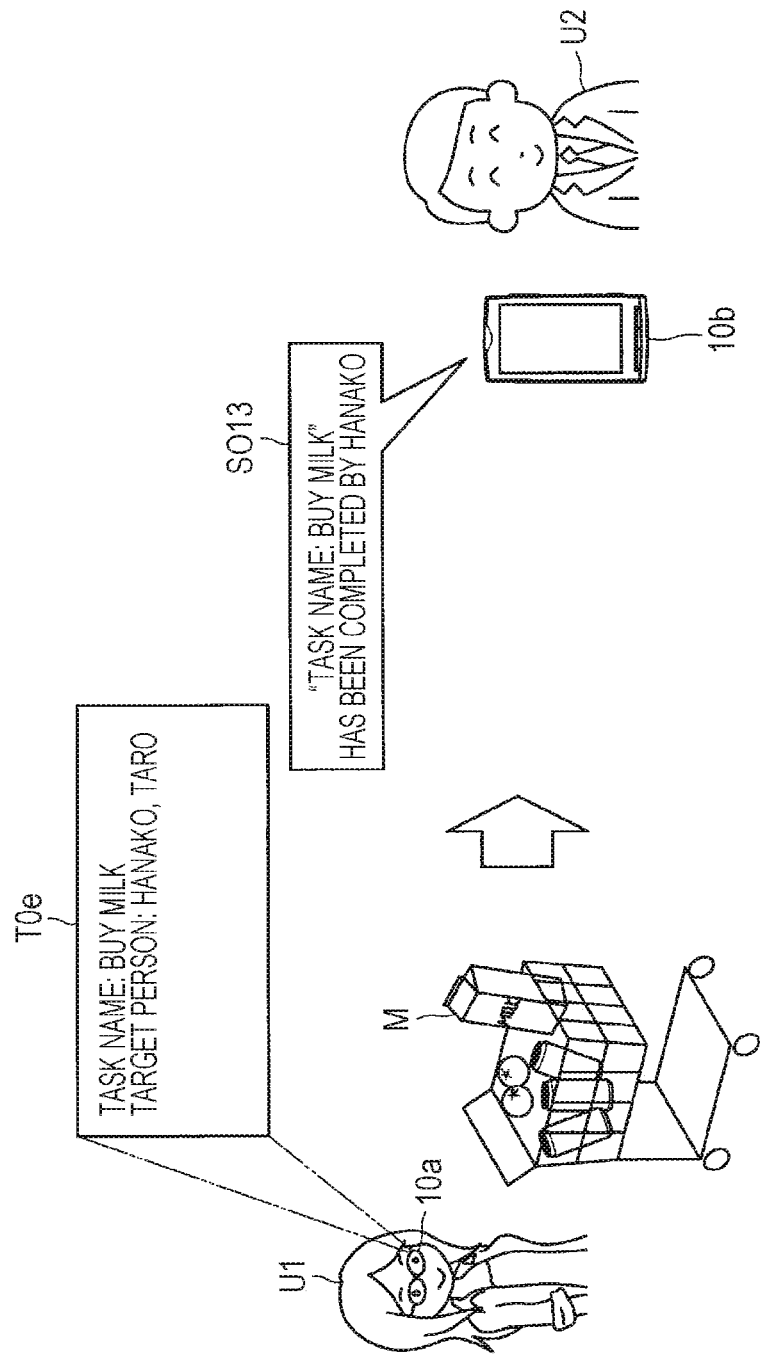
FIG. 13 is a diagram for describing superimposed display of task information according to the embodiment.

Furthermore, the output control unit 270 according to the present embodiment may control superimposed display using an augmented reality (AR) technology in addition to the above-described projection display. FIG. 13 is a diagram for describing superimposed display of task information according to the present embodiment.

The left side in FIG. 13 illustrates an example of a case where the output control unit 270 causes an information processing terminal 10a that is a glass-type wearable device worn by the user U1 to superimpose and display task information T0e. As described above, the output control unit 270 according to the present embodiment can present the task information to the user by superimposing and displaying the task information even in a case where the execution place of the task is outside home, for example.

Furthermore, at this time, in a case where a milk M is recognized from an image captured by the imaging unit 140 provided in the information processing terminal 10a, the task management unit 250 may detects execution of the task by the user U1 and change a status of the task to completion.

In this case, the output control unit 270 according to the present embodiment can output, for example, a sound SO13 indicating completion of the task by the user U1 to an information processing terminal 10b possessed by the user U2 that is one of the target users, as illustrated on the right side in FIG. 13.

As described above, the output control unit 270 and the task management unit 250 according to the present embodiment can effectively manage the task even outside and can implement a highly convenient task management application. Note that, in the above description, the case of implementing output of the task information and update of the status outside by the information processing terminal 10 as a glass-type wearable device has been described as an example. However, the information processing terminal 10 according to the present embodiment may be a device such as a bearable device including the sound output unit 120 and the sound input unit 130 and not including the display unit 110 and the imaging unit 140, for example. Even in this case, the task information can be presented and managed outside by input/output using sound.

The output control of the task information by the output control unit 270 according to the present embodiment has been described. Note that, in the above description, the case where the output control unit 270 mainly controls the output position of the task information has been described. However, the output control unit 270 according to the present embodiment can control output timing of the task information on the basis of a context, for example.

<<1.6. Flow of Control>>

Figure 14:
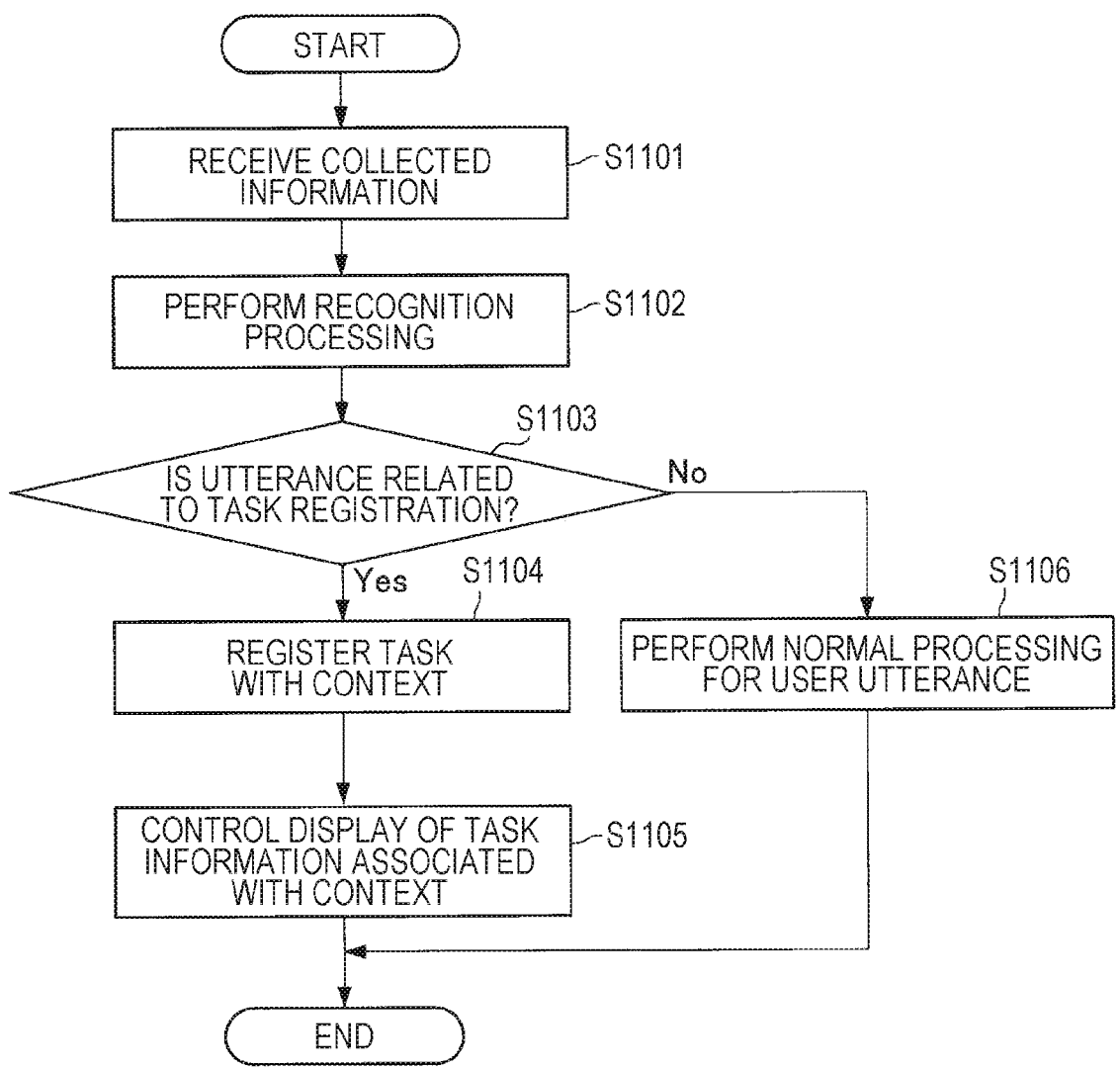
FIG. 14 is a flowchart illustrating a flow of task information registration and output control according to the embodiment.

Next, a flow of control by the information processing server 20 according to the present embodiment will be described. First, a flow of task information registration and output control according to the present embodiment will be described. FIG. 14 is a flowchart illustrating a flow of task information registration and output control according to the present embodiment.

Referring to FIG. 14, first, the terminal communication unit 290 receives collected information from the information processing terminal 10 (S1101). The collected information includes sound information, image information, and sensor information.

Next, various types of recognition processing are performed by the sound recognition unit 210, the semantic analysis unit 220, the user recognition unit 230, and the object recognition unit 240 (S1102).

Next, the task management unit 250 determines whether or not a user's utterance recognized and analyzed in step S1102 is related to task registration (S1103). Here, in a case where the user's utterance is not related to task registration (S1103: No), the information processing server 20 executes normal processing for the user's utterance (S1106).

On the other hand, in a case where the user's utterance recognized and analyzed in step S1102 is related to task registration (S1103: Yes), the task management unit 250 registers a context acquired on the basis of various types of information recognized in step S1102 in association with a task (S1104).

Next, the output control unit 270 causes the information processing terminal 10 to output task information including the task and the context registered in step S1104.

The flow of task registration and output control according to the present embodiment has been described. The above function of the information processing server 20 according to the present embodiment can implement information presentation that can be more easily grasped by the user by registering various situations related to task registration in association with a task. Note that, in the present embodiment, an example of the case where the task management unit 250 automatically registers the task has been mainly described. However, the task according to the present embodiment may be explicitly registered by the user. At this time, the user may cause the information processing terminal 10 to capture an image of an article to be targeted in a task and register the image together with a task as a context, for example.

Figure 15:
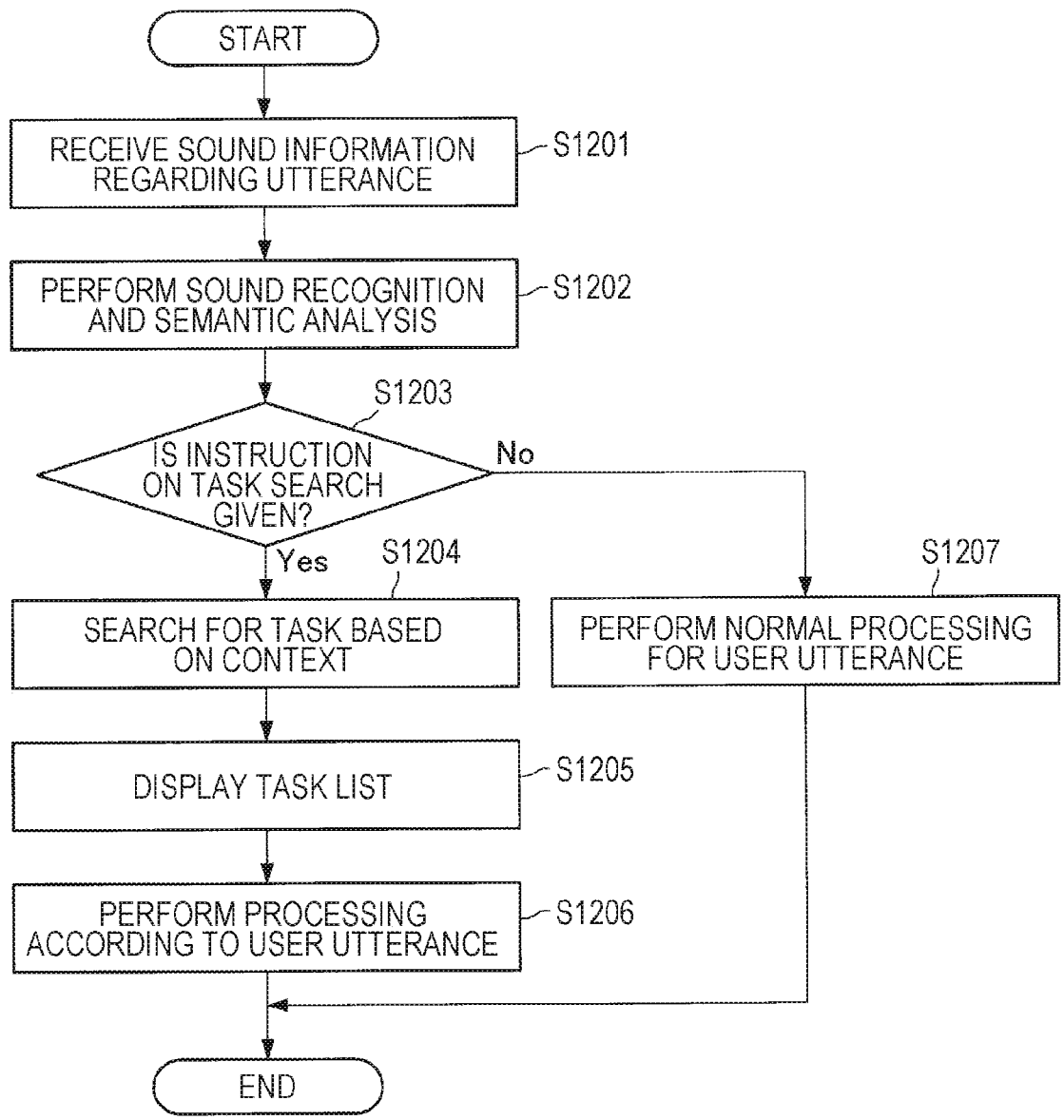
FIG. 15 is a flowchart illustrating a flow of task search control according to the embodiment.

Next, a flow of task search control according to the present embodiment will be described. FIG. 15 is a flowchart illustrating a flow of task search control according to the present embodiment.

Referring to FIG. 15, first, the terminal communication unit 290 receives sound information regarding an utterance of the user (S1201).

Next, sound recognition processing by the sound recognition unit 210 and a semantic analysis by the semantic analysis unit 220 are executed (S1202).

Next, the task management unit 250 determines whether or not the user's utterance recognized and analyzed in step S1202 is related to task search (S1203). Here, in a case where the user's utterance is not related to task search (S1203: No), the information processing server 20 executes the normal processing for the user's utterance (S1206).

On the other hand, in a case where the user's utterance recognized and analyzed in step S1202 is related to task search (S1203: Yes), the output control unit 270 searches for the task information registered in the task DB 260 on the basis of a context specified by the user and the like (S1204).

Next, the output control unit 270 causes the information processing terminal 10 to output a task list acquired in step S1204 (S1205).

Next, the task management unit 250 executes corresponding processing (for example, correction, deletion, completion of status) and the like on the basis of the recognized user's utterance (S1205).

2. Hardware Configuration Example

Next, a hardware configuration example of the information processing server 20 according to the embodiment of the present disclosure will be described. FIG. 16 is a block diagram illustrating a hardware configuration example of the information processing server 20 according to the embodiment of the present disclosure. Referring to FIG. 16, the information processing server 20 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the configuration elements may be omitted. Furthermore, a configuration element other than the configuration elements illustrated here may be further included.

(Processor 871)

The processor 871 functions as, for example, an arithmetic processing unit or a control unit, and controls the overall operation or a part thereof of the configuration elements on the basis of various programs recorded in the ROM 872, RAM 873, storage 880, or removable recording medium 901.

(ROM 872 and RAM 873)

The ROM 872 is a means for storing a program read by the processor 871, data used for calculation, and the like. The RAM 873 temporarily or permanently stores, for example, a program read by the processor 871, various parameters that change as appropriate when the program is executed, and the like.

(Host Bus 874, Bridge 875, External Bus 876, and Interface 877)

The processor 871, the ROM 872, and the RAM 873 are connected to one another via, for example, the host bus 874 capable of high-speed data transmission. Meanwhile, the host bus 874 is connected to the external bus 876 having a relatively low data transmission speed via the bridge 875, for example. Furthermore, the external bus 876 is connected to various configuration elements via the interface 877.

(Output Device 878)

As the input device 878, for example, a mouse, a keyboard, a touch panel, a button, a switch, a lever, and the like are used. Moreover, as the input device 878, a remote controller (hereinafter referred to as a remote controller) capable of transmitting a control signal using infrared rays or other radio waves may be used. Furthermore, the input device 878 includes a sound input device such as a microphone.

(Output Device 879)

The output device 879 is a device that can visually or audibly notify a user of acquired information, such as a display device such as a cathode ray tube (CRT), an LCD, or an organic EL, an audio output device such as a speaker or a headphone, a printer, a mobile phone, or a facsimile, for example. Furthermore, the output device 879 according to the present disclosure includes various vibration devices that can output tactile stimuli.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on the removable recording medium 901 such as a magnetic disk, an optical disk, a magneto-optical disk, or a semiconductor memory, or writes information to the removable recording medium 901, for example.

(Removable Recording Medium 901)

The removable recording medium 901 is, for example, a DVD medium, a Blu-ray (registered trademark) medium, an HD-DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE1394 port, a small computer system interface (SCSI), an RS-232C port, or an optical audio terminal, for example.

(External Connection Device 902)

The external connection device 902 is, for example, a printer, a portable music player, a digital camera, a digital video camera, an IC recorder, or the like.

(Communication Device 883)

The communication device 883 is a communication device for being connected to a network, and is, for example, a communication card for wired or wireless LAN, a Bluetooth (registered trademark), a wireless USB (WUSB), a router for optical communication, an asymmetric digital subscriber line (ADSL) router, one of various communication modems, or the like.

3. Conclusion

As described above, the information processing server 20 according to the embodiment of the present disclosure includes the task management unit 250 that registers the task to be executed by the user on the basis of the detected utterance. Furthermore, the task management unit 250 according to the embodiment of the present disclosure is characterized in registering the task in association with the context acquired along with the utterance and reminding the user of the content of the task. According to such a configuration, task information that can be more easily recalled by the user can be presented to the user.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and the modifications and alterations are naturally understood to belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Furthermore, the steps in the processing of the information processing server 20 of the present specification do not necessarily need be processed chronologically in the order described as the flowcharts. For example, the steps regarding the processing of the information processing server 20 may be processed in an order different from the order described as the flowcharts or may be processed in parallel.

Note that following configurations also belong to the technical scope of the present disclosure.

(1)

An information processing apparatus including:

a task management unit configured to register a task to be executed by a user on the basis of a detected utterance, in which the task management unit registers the task and a context acquired along with the utterance and reminding the user of content of the task in association with each other.

(2)

The information processing apparatus according to (1), in which the task management unit estimates the task on the basis of the utterance and registers the estimated task and the context in association with each other.

(3)

The information processing apparatus according to (2), in which the task management unit estimates at least one of content, a target user, or a deadline, of the task on the basis of the utterance.

(4)

The information processing apparatus according to any one of (1) to (3), in which the context includes an image acquired along with the utterance, and the task management unit registers the task and the image in association with each other.

(5)

The information processing apparatus according to (4), in which the image includes an image of an article to be targeted for an action in the task.

(6)

The information processing apparatus according to (4) or (5), in which the image includes an image illustrating a situation of the user, the image being acquired along with the utterance.

(7)

The information processing apparatus according to any one of (1) to (6), in which the context includes the utterance or a sound acquired along with the utterance, and the task management unit registers the task and at least one of the utterance or the sound in association with each other.

(8)

The information processing apparatus according to any one of (1) to (7), in which the context includes at least one of a user's action or a user's state estimated along with the utterance, and the task management unit registers the task and at least one of the action or the state in association with each other.

(9)

The information processing apparatus according to any one of (1) to (8), in which the context includes a requester of the task, and the task management unit registers the task and the requester in association with each other.

(10)

The information processing apparatus according to any one of (1) to (9), in which the context includes at least one of a registration place or an execution place of the task, and the task management unit registers the task and at least one of the registration place or the execution place in association with each other.

(11)

The information processing apparatus according to any one of (1) to (10), in which the task management unit registers a behavior of another person acquired along with the utterance in association with the task as the context.

(12)

The information processing apparatus according to (11), in which, in a case where a relevance between the behavior of the another person and the task is low, the task management unit determines that the behavior of the another person is not suitable as the context and does not associate the behavior with the task.

(13)

The information processing apparatus according to any one of (1) to (12), in which in a case where execution of the task by the user is detected, the task management unit changes a status of the task to completion.

(14)

The information processing apparatus according to any one of (1) to (13), further including:

an output control unit configured to control an output of task information regarding the task, in which the output control unit outputs the task information in which the task and the context are associated with each other.

(15)

The information processing apparatus according to (14), in which the context includes a video or a sound, and the output control unit controls reproduction of the video or the sound included in the task information.

(16)

The information processing apparatus according to (14) or (15), in which the output control unit controls an output position of the task information on the basis of a target user of the task.

(17)

The information processing apparatus according to any one of (14) to (16), in which the output control unit controls an output position of the task information on the basis of a registration place of the task.

(18)

The information processing apparatus according to any one of (14) to (17), in which the output control unit controls an output position of the task information on the basis of an execution place of the task.

(19)

The information processing apparatus according to any one of (14) to (18), in which the output control unit acquires a list of the tasks associated with the context specified by the user, and controls an output of the list.

(20)

An information processing method including:

registering, by a processor, a task to be executed by a user on the basis of a detected utterance, the registering further including registering the task and a context acquired along with the utterance and reminding the user of content of the task in association with each other.

REFERENCE SIGNS LIST

10 Information processing terminal
110 Display unit
120 Sound output unit
130 Sound input unit
140 Imaging unit
150 Sensor unit
160 Control unit
170 Server communication unit
20 Information processing server
210 Sound recognition unit
220 Semantic analysis unit
230 User recognition unit
240 Object recognition unit
250 Task management unit
260 Task DB
270 Output control unit
280 User DB
285 General object DB
290 Terminal communication unit

The invention claimed is:

1. An information processing apparatus, comprising:
a task management unit configured to:
detect a user utterance associated with a user;
register a task based on the detected user utterance;
acquire a first context associated with the user utterance, wherein the first context indicates a first action of the user before the detection of the user utterance;
register the acquired first context; and
remind the user of content of the task based on the registered task and the first context.

2. The information processing apparatus according to claim 1, wherein the task management unit is further configured to:
estimate the task based on the user utterance; and
register the estimated task and the first context in association with the estimated task.

3. The information processing apparatus according to claim 2, wherein the task management unit is further configured to estimate at least one of content of the task, a target user of the task, or a deadline of the task based on the user utterance.

4. The information processing apparatus according to claim 1, wherein
the first context includes an image associated with the user utterance, and
register the task and the image in association with the task.

5. The information processing apparatus according to claim 4, wherein
the image includes an image of an article, and
the article is a target for a second action in the task.

6. The information processing apparatus according to claim 4, wherein the image includes an image illustrating a situation of the user.

7. The information processing apparatus according to claim 1, wherein the task management unit is further configured to:
acquire a sound associated with the user utterance;
acquire a second context that includes at least one of the user utterance or the acquired sound; and
register the task and at least one of the user utterance or the sound in association with the task.

8. The information processing apparatus according to claim 1, wherein the task management unit is further configured to:
estimate a user state associated with the user utterance;
acquire a second context that indicates the estimated user state; and
register the task and the estimated user state in association with the task.

9. The information processing apparatus according to claim 1, wherein the task management unit is further configured to:
acquire a second context that includes a requester of the task; and
register the task and the requester in association with the task.

10. The information processing apparatus according to claim 1, wherein the task management unit is further configured to:
acquire a second context that includes at least one of a registration place or an execution place of the task; and
register the task and at least one of the registration place or the execution place in association with the task.

11. The information processing apparatus according to claim 1, wherein the task management unit is further configured to:
acquire a behavior of a first person associated with the user utterance, wherein the first person is different from the user; and
register the behavior of the first person in association with the task as a second context.

12. The information processing apparatus according to claim 11, wherein the task management unit is further configured to:
acquire a behavior of a second person associated with the user utterance, wherein the second person is different from the user;
determine a relevance between a behavior of the second person and the task; and
refrain the association of the behavior of the second person with the task based on the determined relevance.

13. The information processing apparatus according to claim 1, wherein the task management unit is further configured to:
detect execution of the task by the user; and
change a status of the task to completion based on the detected execution of the task.

14. The information processing apparatus according to claim 1, further comprising an output control unit configured to control an output of task information regarding the task, wherein the task information includes association of the task and as second context.

15. The information processing apparatus according to claim 14, wherein
the second context includes at least one of a video or a sound, and the output control unit is further configured to control reproduction of the video or the sound included in the task information.

16. The information processing apparatus according to claim 14, wherein the output control unit is further configured to control an output position of the task information based on a target user of the task.

17. The information processing apparatus according to claim 14, wherein the output control unit is further configured to control an output position of the task information based on a registration place of the task.

18. The information processing apparatus according to claim 14, wherein the output control unit is further configured to control an output position of the task information based on an execution place of the task.

19. The information processing apparatus according to claim 14, wherein the output control unit is further configured to:
   acquire a list of the tasks associated with the second context, wherein
      the second context is specified by the user, and
      the list of the tasks includes the task; and
   control an output of the list of the tasks.

20. An information processing method, comprising:
   detecting a user utterance associated with a user;
   registering based on the detected user utterance;
   acquiring a context associated with the user utterance, wherein the context indicates an action of the user before the detection of the user utterance;
   registering the acquired context; and
   reminding the user of content of the task based on the registered task and the context.

* * * * *